March 4, 1952 M. GREGA 2,587,615

TIME CHART

Filed Aug. 14, 1946 2 SHEETS—SHEET 1

INVENTOR.
MIKE GREGA
BY
Henry N. Young
ATTORNEY

March 4, 1952 M. GREGA 2,587,615

TIME CHART

Filed Aug. 14, 1946 2 SHEETS—SHEET 2

INVENTOR

MIKE GREGA

BY Henry N. Young

ATTORNEY

Patented Mar. 4, 1952

2,587,615

UNITED STATES PATENT OFFICE 2,587,615

TIME CHART

Mike Grega, Honolulu, Territory of Hawaii

Application August 14, 1946, Serial No. 690,360

11 Claims. (Cl. 35—19)

The invention relates to a device for ascertaining the time and/or ionosphere conditions for different given global points at any given time.

An object of the invention is to provide means for directly indicating corresponding solar times at different global points.

Another object is to provide a device for ascertaining the expected action of the ionosphere on the transmission of radio waves between given global points at a given time.

A further object is to provide for a clock-controlled actuation of the device in accordance with the solar time at the locale of the device.

The invention possesses other objects and features of advantage, some of which, with the foregoing will be set forth or be apparent, from a consideration of the following specifications and the accompanying drawings, in which, Figure 1 is a face view of a chart embodying the features of present invention.

Figure 1:
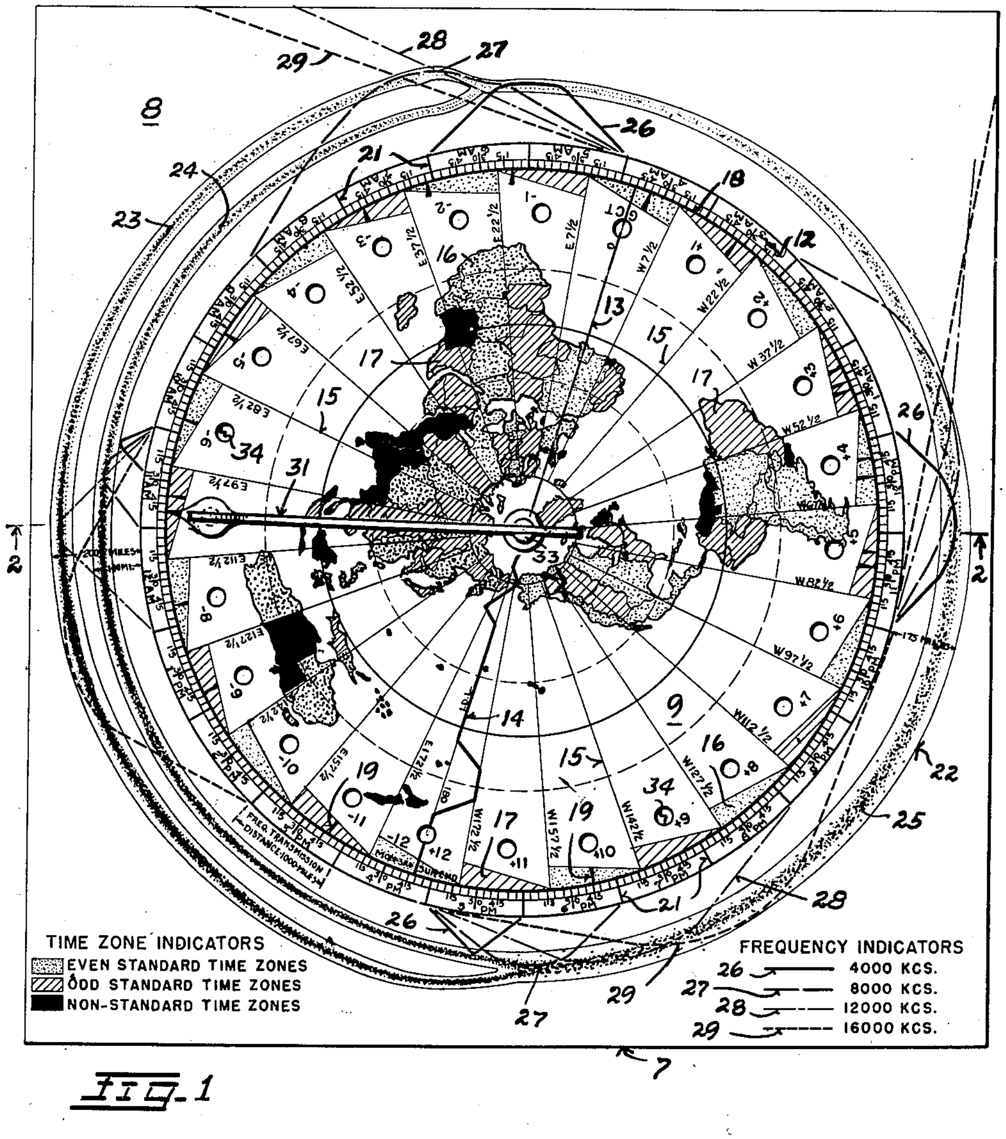
Figure 2:
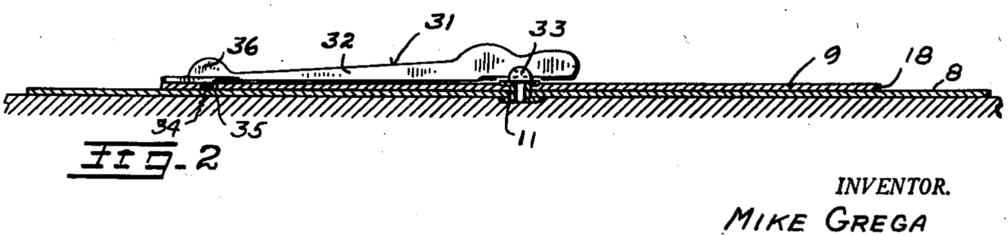
Figure 2 is a section at the line 2—2 in Figure 1.

In the embodiment of Figures 1 and 2, certain features of present invention are provided on and in connection with a flat base member 8 mounting a circular disc member 9 for rotation about an axis through its center and fixedly related to the base. The base 8 and disc 9 comprise relatively thin plate elements which are swiveled together at the disc center by a pivot pin 11 having the form of a hollow rivet. The base 8 extends radially beyond the disc 9 and is provided on its face portion outwardly of the disc with a fixed hour circle 12 which is calibrated on a twenty-four hour day basis. The calibrations of the hour circle 12 may be marked directly on the face of the base 8, as is indicated, or be otherwise provided, as on a scale circle having its outer face flush with the outer face of the disc 9.

For reference in manners to be hereinafter brought out, the exposed face of the disc 9 has delineated thereon a world map in polar azimuthal equi-distant projection with respect to the North Pole as being positioned in the axis of swiveling of the disc. A radial line 13 from the North Pole through the map point designating Greenwich, England, designates the Greenwich meridian, and an oppositely-extending line 14 designates and is shaped as the international date line. Lines 15 radiate from the disc center point to define between them the twenty-four theoretical standard time zones with respect to the Greenwich meridian. It will be noted that the Greenwich meridian line 13 bisects the Greenwich time zone, and that all time zones extend for fifteen degrees of the disc circle. The various lines 15 are identified with respect to the Greenwich meridian by association therewith of angle indicia; thus, the standard time zone including the Greenwich meridian is bounded by lines designated "E7½" and "W7½." Also, the other time zones are numbered in order to the east and to the west of the Greenwich zone toward the international date line, there being eleven fifteen degree time zones each way from the Greenwich zone and two half zones making up the time zone which includes the international date line 14.

As an aid to identifying the different time zones, the same may be numbered, preferably with reference to the Greenwich time zone. Accordingly, and as shown, the various time zones are numbered to the east and west from the Greenwich zone to the zone of the international date line 14, the zones to the west of the Greenwich zone being designated by plus numbers 1–12 inclusive, while the zones to the east of the Greenwich zone are designated by minus numbers 1 to 12 inclusive; the plus 12 and minus 12 zones each extend for seven and one-half degrees of arc and jointly provide the international date line zone. Also, the change of day in the international date line zone may be indicated in the zone for guiding a user to an understanding of the effect of crossing the international date line; the relations of Sunday and Monday are designated at the outer zone end. The location of the Equator is indicated on the present map by a circular full line, and the location of the Tropic of Cancer and Tropic of Capricorn are shown by circular dash lines.

Recalling that the meridian lines 15 are seldom followed exactly as time zone boundaries for land areas because of topographical peculiarities and/or national boundaries, means are provided to so indicate actual time zone boundaries with respect to the land areas of the globe that the actual time zone of a particular location may be ascertained by direct inspection of the map. Accordingly, land areas in adjacent time zones are mutually differentiated on the present map in such a manner that the actual time zone for any area may be positively and directly indicated, the differentiation being made by color or surface shading or some other suitable means.

In the present showing, land areas utilizing alternate standard time zones are indicated by light-shaded or stippled land areas, the Greenwich zone area and the even-numbered areas being stippled. As an aid to interpreting the time zone designations on the map, each time zone is provided adjacent the disc edge with an area which is marked to correspond with the shading for that zone. Thus, the Greenwich zone and alternate zones around the disc circle have generally triangular outer-end areas 16 stippled, while the remaining time zones have generally triangular outer end areas 17 line-shaded with lines which are mutually parallel for all of the areas. The peripheral edge 18 of the disc 9 and the different time zone lines 15 define two sides of the shaded areas 16 and 17 in such a manner that the points of the triangles of said areas are directed in a counterclockwise direction with respect to the radial triangle sides; with this arrangement, said areas point in to the direction of the counter-clockwise rotation of the earth about its axis of rotation as viewed from the North Pole, and represent the solar time at the meridian lines at their points.

Recalling that standard time is not used for certain considerable areas of the earth, said areas are differentiated from standard time zone areas in a suitable manner as by showing them in solid color, or in black, as shown. For indicating the effective time zone for those areas not using standard time, radial marks 19 are provided in appropriate areas 17 or 18, said marks indicating with respect to meridian lines 15 in advance of them the actual solar time which is used as the beginning of the hours of the day. For instance, by reference to the showing of New Zealand on the map, it will be noted that the corresponding mark 19 indicates that New Zealand time is one half hour later than that of the standard zone "minus eleven." As an example of the topographical determination of the side boundaries of the time zone, the central time zone for North America, which is shown as a stippled area, generally straddles the meridian line "97½" which comprises the west boundary of its theoretical zone. On the other hand, the Union of South Africa, which is substantially two zones wide, has "−2" for its entire area.

The present chart comprising the map disc and base combination may be used to determine the simultaneous clock times at different geographic points in terms of the time at one of said points. To utilize the present unit for such a purpose, it is merely necessary to dispose the time zone for the point of reference in registration with the appropriate hour circle division 21, and ascertain the desired time by direct reading at the hour circle division 21 for the time zone which includes the other point. In this manner, simultaneous times may be ascertained for any desired number of geographic points to facilitate determinations within the hour; the time zone divisions 21 may be subdivided to represent five minute intervals as is illustrated. As particularly shown, and in terms of the illustrated position of the unit 8—9, the calibration of the hour circle 12 is such that the sun is assumed to be at the left of the circle in the radial line from the disc center through the 12 a. m. line on the circle, whereby the portion of the earth to the left of the 6 a. m.–6 p. m. disc diameter is, generally speaking, in daylight, while night prevails for the balance of the earth.

As is well known, ultraviolet radiation from the sun creates layers of free ions and electrons in the upper atmosphere, said layers each maintaining a relatively fixed directional positioning with respect to the sun and having important effects on the transmission of radio waves used in communications; said layers are known as Kennelly-Heaviside layers, and the atmosphere region occupied by them is called the ionosphere. Accordingly, the present base member 8 has delineated thereon an area 22 representing an "F" layer in the ionosphere, and said "F" layer is presented in such a manner as to give information as to its average effects on radio communications from any particular geographic points at a given time of day. By reference to Figure 1, it will be seen that the "F" layer 22 is divided into outer and inner sections 23 and 24 extending for about half of its circumference and connecting an unbranched portion 25 of the layer. It will be understood that the "F" layer portions 23 and 24 occur in that portion of the ionosphere which is not shaded by the earth, and that ionization in the layer portion nearest the sun is greatest.

For purposes of illustration, line boundaries have been shown for the various portions of the "F" layer, it being understood, however, that no sharp boundary exists between the layer and the adjacent atmosphere. Since the density of ionization varies in the "F" layer, the same has been indicated by the corresponding density of stippling in the layer for indicating the density of ionization around the layer, the showing being arranged to represent the conditions in terms of the earth as viewed from its North Pole, using the outer line of the hour-circle calibrations as representing the surface of the earth. The average distances of the outer boundaries of the layer portions 23 and 24 and 25 are 200 miles and 140 miles and 175 miles, respectively, as is indicated in Figure 1, the different distances being represented to the same scale whereby the "F" layer height may be ascertained opposite any hour circle point.

Noting that one very practical importance of the "F" layer lies in its influence on radio waves emanating from ground points or ships or aircraft, and that the effects are generally constant at different hour-circle points, the base 8 is also provided with lines designating the radio frequency necessary for earth communication over a desired distance during the four times of daytime and evening and night and morning for the earth. As particularly shown, mutually differentiated lines 26 and 27 and 28 and 29 respectively represent transmission at 4,000 kilocycles (kc.), 8,000 kc. and 12,000 kc. and 16,000 kc., the last three frequencies being harmonics of the first, or fundamental frequency. Mutual differentiation of the aforesaid frequency lines may be effected in any desirable manner; the present base 8 provides a key tabulation under which the line 26 is a solid line, the line 27 is a dash line, the line 28 is a dash-dot line and the line 29 is a dotted line. It will be understood that a present chart may bear a number of sets of frequency lines corresponding to the set of lines 26 to 29 inclusive, and based on mutually different fundamental transmission frequencies in accordance with those with which the chart is designed to be used.

An extension of a frequency line through the "F" layer indicates lack of reflection of a wave back to earth, this being indicated for lines 28 and 29 which are projected during the night and morning periods; the indicated effect renders the higher frequencies beyond about 10,000 kilocycles unusable during the night and morning periods.

All other illustrated frequency lines are returned to the earth by refraction and reflection in the "F" layer whereby they show as radial "loops." In order to indicate the distance of workable communications for the different frequencies at the different times, the lengths of the loops along the hour circle 12 are arranged to indicate the limiting ranges of transmission; in the present instance, the representation of an hour, or 15 degress of arc at the Equator, is utilized as representing 1,000 miles of transmission distance along the earth's surface, whereby transmission distances for a given frequency line may be determined directly from the hour circle by using its time calibrations as distance calibrations. It will be understood that transmission distances for other frequencies than those herewith directly represented may be ascertained by interpolation between adjacent frequency lines.

Having a present unit 8—9 provided with the features shown and described, a person at a given geographic point may use the same by adjusting the disc to have the time zone of the point register with the current time on the hour circle and then make a number of valuable determinations. It will be noted that the present unit may be used to demonstrate the counterclockwise rotation of the earth about its north-south axis, how and why time zones are bounded by special meridian lines, the relations of the time zones to the surface of the earth and the relation of time to longitude and to national boundaries and agreements. The present unit is utilized to ascertain the areas using non-standard time, the comparative time between any points, the difference between local time and daylight saving time, the change of date across the international date line and other facts of general or technical interest. The showing of the "F" layer of the ionosphere illustrates the split and height and width and continuity and density of the layer, while the radio frequency lines illustrate and generally measure refraction and reflection and radiation angles and critical frequencies, skip distances and fading and diurnal variations and radio range and the best frequency to use at a given time and place.

Means are preferably provided for marking a time zone of reference on the disc 9 during the use of the present chart, said means also facilitating turning adjustments of the disc 9 with respect to the hour circle 12 provided by the base 8. As particularly shown, a unitary pointer arm or hand unit 31 is provided for mounting on the disc for adjustment about its axis and for engagement selectively with the disc at the different time zone whereby it may be applied at a particular time zone for reference to the hour circle in the use of the chart.

In its present embodiment the arm 31 comprises a flat strip 32 extending radially from a hub member 33 which is arranged for rotatably fitted engagement in the bore of the tubular pivot pin 11 which mutually attaches the disc and base. The plane of the strip 32 includes the hub and axis whereby the arm may interfere to a minimum degree with a viewing of the map beneath it. A line of holes 34 arranged in a circle having its center in the axis of turning of the disc 9 is provided in the disc for selectively receiving an inner projection 35 of the strip 32, there being at least one hole 34 for each zone; said projection may comprise and integral portion of the strip 32 as illustrated or comprise an attached pin. When the arm 31 is mounted on the disc, it may be used as a handle for turning the disc by the fingers, whereby to avoid any application of the fingers to the outer disc face; an outward projection 36 may be provided by the strip 32 to facilitate this disc-turning use of the arm.

Figure 3:
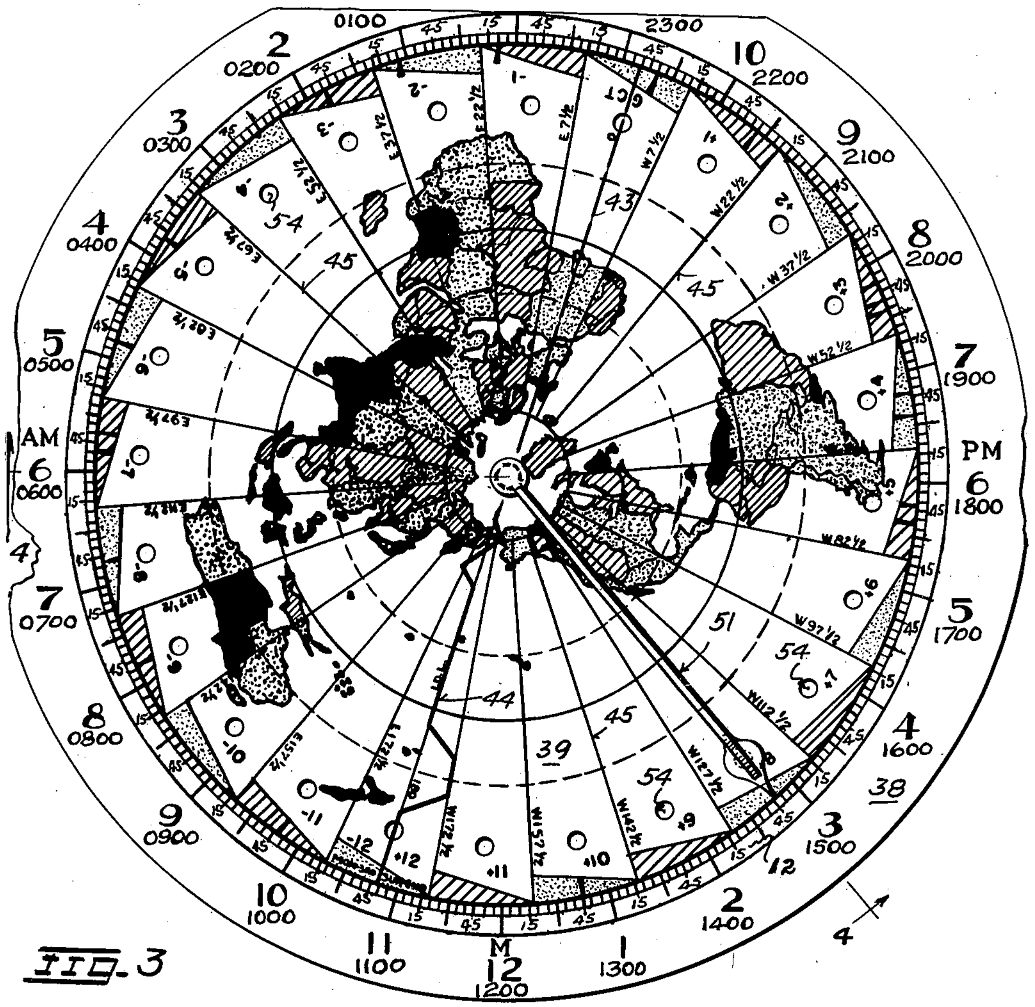
Figure 3 is a view of a clock face having certain features of present chart associated therewith.
Figure 4:
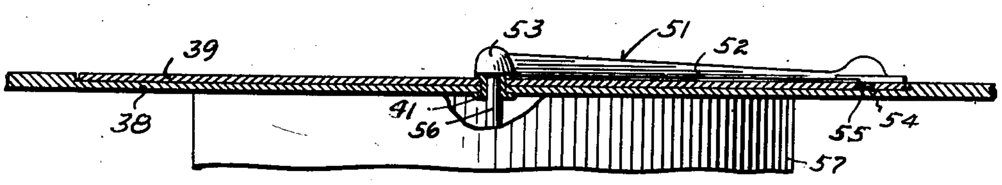
Figure 4 is a section taken at the line 4—4 in Figure 2.

The embodiment of Figures 3 and 4 illustrates an arrangement in which a disc member 39 corresponding to the disc 9 is arranged for rotation with a power- driven hour hand 51 in front of a base member 38 which comprises a clock face and has the disc 39 rotatably mounted thereon at a tubular pivot pin 41. The outer face of the disc 39 has delineated thereon a world map in polar azimuthal equidistant projection, said map including the Greenwich meridian 43, the international date line 44, time zone lines 45, stippled land areas representing the even-numbered time zones with reference to the Greenwich time zone, line shaded areas representing the odd-numbered time zone, and solid shaded areas designating places using non-standard time, all as provided on the disc member 9 of the first embodiment.

The blade 52 of the hour hand 51 extends radially from a hub 53 which is arranged for its rotatable disposal through the pivotal member 41. Preferably, and as shown, the blade portion 52 of the hand is flat and has its plane perpendicular to the face of the disc 39 whereby to interfere to a minimum degree with a viewing of a map portion opposite the hand. At a suitable intermediate point thereof, hand 51 provides a pin 55 extending from the blade 52 transversely toward the map disc 39 for engagement selectively in holes 54 of a circular line thereof provided in the disc and having its center of curvature at the disc axis whereby the moving hand may rotate the disc with it when the pin engages a hole 54; at least one hole 54 is provided in each standard time zone whereby the hand may engage the disc 39 at that zone in which the clock is in use. A spindle 56 carries the hub 53 and extends from a suitable clockworks provided in a casing 57 which fixedly carries the base. For relocating the hand 51 with respect to the time zones, the present hand may be sprung outwardly to disengage its pin 55 from a hole 54, and the disc 39 then adjusted beneath the hand for the re-engagement of the pin with a hole 54 of another selected time zone.

The hour circle 12, it will now be noted, is calibrated on the 24-hour basis, and has its time designations include both the a. m. and p. m. system, and the 24-hour system using combinations of four numbers. Also, with the top point of the hour circle representing midnight, the upper half of the hour circle will represent the time from 6 p. m. to 6 a. m., or 1800 to 0600, and may be differentiated from the remainder of the hour circle by suitable color effects to designate the night half of an astronomical day.

With the present arrangement, the counterclockwise rotation of the attached disc 39 with the hour hand 51 permits a simultaneous determination of times at different global points with respect to the time zone at which the disc is engaged by the hand. Normally, the disc will be attached to the hour hand at the local time zone, whereby the hand 51 indicates local time with reference to the hour circle. It will be understood that the present combination may be used in the manner taught for the first embodiment by rotatively shifting the disc 39 independently of the hand 51. While the present clock arrangement lacks a showing of the "F" layer of the ionosphere, it will be understood that the same might be included on the clock face in the manner taught respecting the first embodiment. Also, the 24-hour time system might be provided at or for the hour circle of the first embodiment.

From the foregoing description taken in connection with the accompanying drawings, the advantages of the construction and use of the present time chart will be readily understood by those skilled in the art to which this invention pertains. While I have described the features and principles of use of time charts which I now consider to comprise preferred embodiments of my invention, I desire to have it understood that the showings are primarily illustrative, and that such changes and developments may be made, when desired, as fall within the scope of the following claims.

I claim:

1. A radio range chart comprising a base providing both the pictorial delineation of an ecliptic hour circle and the generally circular designation of a cross-section of the "F" layer of the ionosphere outwardly of and enclosing the hour circle, and a disc member of less diameter than the hour circle mounted on the base plate for rotation about the center of the hour circle and provided on its exposed face with a world map in polar azimuthal equidistant projection concentric therewith and provided with means defining the actual time zones used in the different world areas for simultaneous reference to said hour circle and "F" layer for a point in a particular time zone.

2. A radio range chart comprising a base plate providing both the designation of an ecliptic hour circle and the generally circular and a concentric representation thereon of a cross-section of a layer of the ionosphere which may influence radio transmission, a disc member of less diameter than the hour circle mounted on the base plate for rotation about the center of the hour circle and provided on its exposed face with a world map in polar azimuthal equidistant projection concentric therewith and provided with means defining the actual time zones used in the different world areas for simultaneous reference to said hour circle and layer for a point in a particular time zone, and means on the base plate for ascertaining by direct reading the range of world radio transmission at a particular sidereal time and particular radio frequency from a particular world point when the standard time zone of the point is registered with the said sidereal time indications of the hour circle.

3. A radio range chart comprising a base plate providing the designation of an ecliptic hour circle and the generally circular and concentric illustration of a cross-section of a layer of the ionosphere which may influence radio transmission, and a disc member of less diameter than the hour circle mounted on the base plate for rotation about the center of the hour circle and provided on its exposed face with a world map in polar azimuthal equidistant projection concentric therewith and provided with means defining the actual time zones used in the different world areas for simultaneous reference to said hour circle and layer for a point in a particular time zone, said ionosphere layer illustration being delineated generally to scale with respect to the equatorial circumference of the world.

4. A radio range chart comprising a base plate providing the illustration of an ecliptic hour circle and the generally circular and concentric representation of a cross-section of a layer of the ionosphere which may influence radio transmission, a disc member of less diameter than the hour circle mounted on the base plate for rotation about the center of the hour circle and provided on its exposed face with a world map in polar azimuthal equidistant projection concentric therewith and provided with means defining the actual time zones used in the different world areas for simultaneous reference to said hour circle and layer for a point in a particular time zone, and a line delineated on the base plate extending from a given point on the hour circle to and from the ionosphere illustration and indicating the range of world radio transmission at a particular sidereal time and particular radio frequency for a world point when the time zone for the world point is registered with the point on the hour circle from which said line extends.

5. A radio range chart comprising a base plate providing the illustration of an ecliptic hour circle and the generally circular and concentric representation of a cross-section of a layer of the ionosphere which may influence radio transmission, a disc member of less diameter than the hour circle mounted on the base plate for rotation about the center of the hour circle and provided on its exposed face with a world map in polar azimuthal equidistant projection concentric therewith and provided with means defining the actual time zones used in the different world areas for simultaneous reference to said hour circle and layer for a point in a particular time zone, and lines on the base plate extending from circumferentially spaced points of the hour circle to and from the ionosphere illustration and indicating the ranges of world radio transmission at the particular sidereal times of the points for particular designated radio frequencies.

6. In a radio range chart, a base plate having delineated on a face thereof an ecliptic hour circle and a coaxial reference circle representing the surface of the earth and a pictorial delineation of a cross-section of the "F" layer of the earth's ionosphere enclosing said circles, a disc member meridianally lined into the twenty-four standard time zones and disposed opposite the hour circle face of the base in coaxial relation to the hour circle, and means swiveling the disc member to the base plate for its rotative adjustment with respect to the hour circle for the simultaneous reference of a point in a particular time zone to said hour circle and to said "F" layer at said reference circle.

7. A structure in accordance with claim 6 wherein the delineated "F" layer has a scaled height and thickness relation to the reference circle.

8. A structure in accordance with claim 6 wherein the delineated "F" layer has a scaled length relation to the reference circle.

9. A structure in accordance with claim 6 having the base plate provided with a set of lines representing the same radio transmission frequency and disclosing radio transmission paths extending from spaced sending points of the reference line to and from the "F" layer for reference thereto for directly ascertaining the maximum radio transmission range from a given earth point in accordance with the setting of the meridian of the earth point with respect to the hour circle.

10. A structure in accordance with claim 6 having the base plate provided with a set of lines in which each represents a different radio transmission frequency, said lines extending from a common point of the reference line to and from the "F" layer for reference thereto for directly ascertaining the radio transmission path and range from a given earth point in accordance with the setting of the meridian of the earth point with reference to the point of the reference line from which the lines of the set extend.

11. In a radio range chart, a base plate having delineated on a face thereof an ecliptic hour circle and a coaxial reference circle representing the surface of the earth and a pictorial delineation of a cross-section of the "F" layer of the earth's ionosphere outwardly of said circles, a disc member meridianally lined into the twenty-four standard time zones and disposed opposite the hour circle face of the base in coaxial relation to the hour circle, and means unitarily associating the disc member and the base plate for their relative rotative adjustment about the common axis of the disc member and the hour circle for the simultaneous reference of a point in a particular time zone to said hour circle and to said "F" layer at said reference circle.

MIKE GREGA.

REFERENCES CITED

The following references are of record in the file of this patent:

UNITED STATES PATENTS

| Number | Name | Date |
|---|---|---|
| 1,145,020 | Hill | July 6, 1915 |
| 1,223,128 | Wallace | Apr. 17, 1917 |
| 1,975,100 | Grant | Oct. 2, 1934 |
| 2,056,089 | Boggs | Sept. 29, 1936 |
| 2,169,956 | Leatart | Aug. 15, 1939 |